United States Patent Office 3,218,672
Patented Nov. 23, 1965

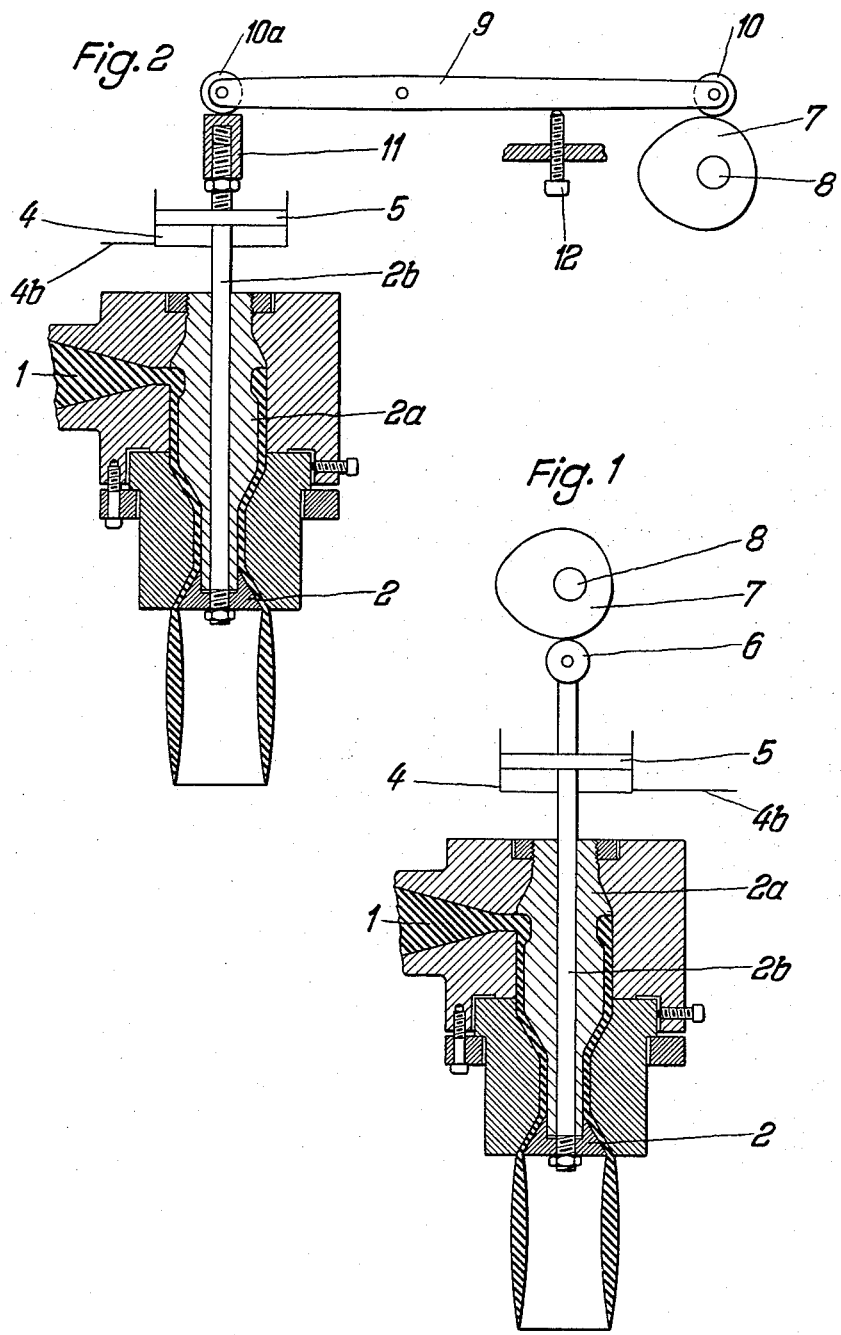

3,218,672
APPARATUS FOR PRODUCTION OF HOLLOW
BODIES FROM THERMOPLASTIC SYNTHETIC
MATERIAL
Erhard Langecker, 32 Osstrasse, Meinerzhagen, Germany
Filed Jan. 15, 1962, Ser. No. 166,142
Claims priority, application Germany, June 9, 1961,
K 43,948
4 Claims. (Cl. 18—14)

Devices have already been proposed for the production of hollow bodies from thermoplastic synthetic material by extrusion through an annular die with a nozzle core adjustable relatively to the nozzle sleeve, in which the head of the nozzle core is made conical and forms together with a correspondingly shaped bore of the nozzle liner an adjustable discharge orifice. The discharge orifice, according to this prior proposal, can be automatically increased or diminished, according to the hose length extruded, during the extrusion process at desired places of the hose along its length, where it is desired to vary its thickness. The nozzle orifice is adjusted in this connection between a narrowest and a widest position, and the control of the transition from the minimum ejection quantity per unit length of extruded hose to the maximum and vice versa, is effected by more rapid or slower operation of the adjustment. In other words it is only possible to pass from a minimum ejection quantity per cm. length of hose extruded to a larger quantity or vice versa, by adjusting the quantity extruded linearly to the desired quantity.

It has also been already suggested to displace the nozzle core relatively to the nozzle sleeve by any reliable mechanical, pneumatic, and electric means and to form the exit channel between the core and sleeve partly conical. In the known embodiments of such constructions the end part of the nozzle orifice are always formed cylindrical, whereby the disadvantage arose that, when displacing the core from the initial position in which the end surface of the nozzle sleeve and of the nozzle core are aligned, either inwardly, i.e. with retracted nozzle core, the extruded thermoplastic mass formed first an accumulation before the nozzle core and the extruded hose piece was closed at its upper end, or outwardly i.e., with projecting nozzle core, and the hose was not extruded cylindrically with the same inner diameter as the exit ending of the orifice, but was vaulted outwardly at the exit of the orifice during extrusion. The reason therefore was, that with this embodiment the exit cross section proper remains unchanged, and only the stowing pressure, i.e. the pressure with which the material is extruded, changes due to the conical form of the nozzle core and nozzle sleeve. Therefore, it was impossible to begin the extrusion process at any position of the nozzle core relatively to the nozzle sleeve, but at the beginning of the extrusion process the nozzle core must be so adjusted that its lower surface is in the same plane with the lower surface of the nozzle sleeve, and it was necessary to begin with the thinnest width of the wall of the extruded hose or body.

The invention removes this disadvantage thereby that the conical part of the extrusion channel is provided at the outer end of said channel so that extrusion could be started at any liable position of the nozzle core and the nozzle sleeve by displacing these parts relatively to each other, e.g. by a cam so that any desired wall thickness of the extruded hose could be obtained. The cam disk may be driven synchronously with cams for controlling other operations of the machine and the cam follower is connected with the piston of a hydraulic drive holding the cam follower against the cam under the action of a changeable hydraulic pressure.

The invention overcomes these disadvantages and enables a device to be obtained with which it is possible to effect the control of the discharge rate or of the discharge orifice in a non-linear manner, but with which it is possible during the extrusion process to carry out control continuously as desired in dependence to the length of hose extruded, so that a hose blank can be extruded, which permits the blowing of a hollow body of any shape desired and of uniform or varying wall thickness.

It is possible to use for the control any desired means which are already known for other purposes, for example link transmissions or crank transmission, but the control of the size of the die orifice is best effected in accordance with the invention however by means of a cam gear permitting a desired shape, in dependence on a cam. If in this case there are placed on the spindle of the cam or on a spindle rotating synchronously with this, the operating cams for the control of other operations of the machine, then there is simultaneously obtained an adjustment of the nozzle orifice in dependence on the hose length.

Specific embodiments will now be described by way of example with reference to the accompanying drawings in which:

FIGURE 1 is a form of embodiment in which the nozzle adjustment is effected by an hydraulic cylinder, which is controlled against a constant pressure closing the nozzle orifice relating to a cam.

FIGURE 2 is an embodiment in which the cam does not act directly on the nozzle cone, but via an intermediate lever.

In all the figures those parts which are equivalent and act in the same way are designated by the same reference numerals.

Figure 3:
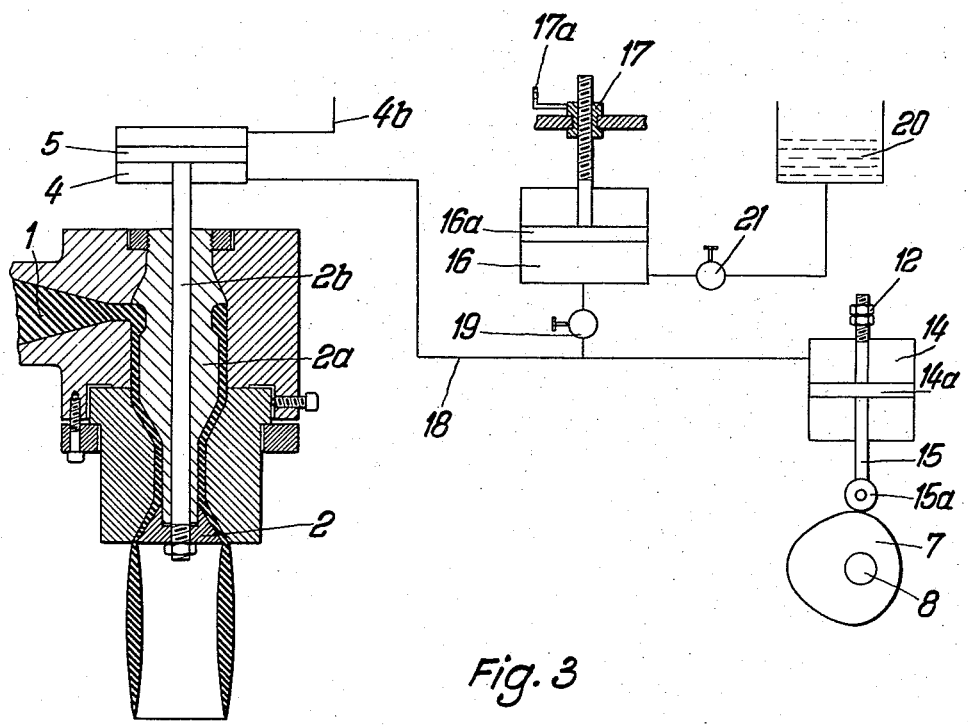
FIGURE 3 shows a form of embodiment in which the hydraulic piston is controlled against a constant pressure opening the nozzle orifice by a cam controllable by hand.

In the embodiment in FIGURE 1 the feed of the injected mass is effected in the extrusion head through a lateral duct 1. The nozzle core is two-part, and consists of the nozzle cone 2 and the upper part 2a. The cone is fixed to a rod 2b, which passes through the upper core portion and is connected with the piston 5 of an hydraulic cylinder 4. Pressure fluid is fed to the chamber of the cylinder 4 located below the piston through a pipe 4b, which pressure fluid presses the piston 5 upwards and presses a roller 6 rotatably supported at the upper end of the rod 2b against a cam 7. The cam 7 is mounted on a shaft 8, which rotates synchronously, i.e. in the same direction and at the same speed as the shaft on which other cams controlling the machine are fitted. This last mentioned shaft is not illustrated, as it corresponds to the shaft 30 in FIG. 1 of my prior U.S. Patent No. 2,978,745. Alternatively the cam 7 may be mounted on this shaft.

The shaft 8 is driven by an infinitely variable controllable speed change gear and makes one rotation for each operational process in the usual manner. As the cam 7, as already indicated, works at the same rate as the control of the whole machine, that is to say also of the feed member, which supplies the thermoplastic material to the nozzle, the feed member and the size of the nozzle orifice are simultaneously controlled relating to the hose length, and it is therefore possible to adjust the nozzle orifice and hence the quantity ejected relating to the hose length extruded according to the cam shape chosen as desired.

In the form of embodiment in FIGURE 2 the cam 7 located on the cam shaft 8 does not act directly on the rod 2b carrying the nozzle cone 2, but the roller 10 controlled by the cam 7 is mounted on one end of a lever 9, which supports at its other end a roller 10a, which acts via an adjustable nut 11 on the rod 2b. The stroke of the hydraulic piston 5 inside the cylinder 4 can be restricted in this form of embodiment by a stop screw 12, which is applied to a fixed portion of the machine, in an adjustable manner. By this stop the action of the cam 7 can be restricted, and thus, it is possible for example to adjust minimum wall thicknesses on a hose being produced.

In the embodiment in FIGURE 3 a continuous pressure acts on the upper side of the piston 5 for control of the nozzle cone through a pipe 4b leading into the upper chamber of the cylinder 4, while the underside of the piston is connected through a pipe 18, with a control cylinder 14. In this control cylinder a piston 14a moves, whose rod 15 carries a roller 15a. The latter is held, by the over pressure in the upper portion of the cylinder 14, in position on the cam 7 of the shaft 8. Here again therefore the nozzle core 2 is raised and lowered by the cam relating to the extruded length according to the shape of the cam.

A cylinder 16 is connected, through a valve 19, with the pipe 18. In the cylinder 16 a piston 16a moves, whose rod is threaded, on which thread a nut 17 is applied. By rotating this nut, for example by means of the handgrip 17a, the piston 16 can be raised and lowered and thereby a greater or less quantity of oil can be pressed into the pipe system, between the piston 5 and the piston 14a. It is thus possible to control the nozzle orifice by rotating the nut 17 independently of the control by the cam 7.

The cylinder 16 is connected through a valve 21 with an oil container 20. When the nozzle orifice is correctly adjusted the valve 19 remains closed. It is however possible to fill the pipe system afterwards, free from air bubbles, by opening the valve 21 and allowing oil to be sucked from the oil reservoir 20 into the cylinder 16.

Figure 4:
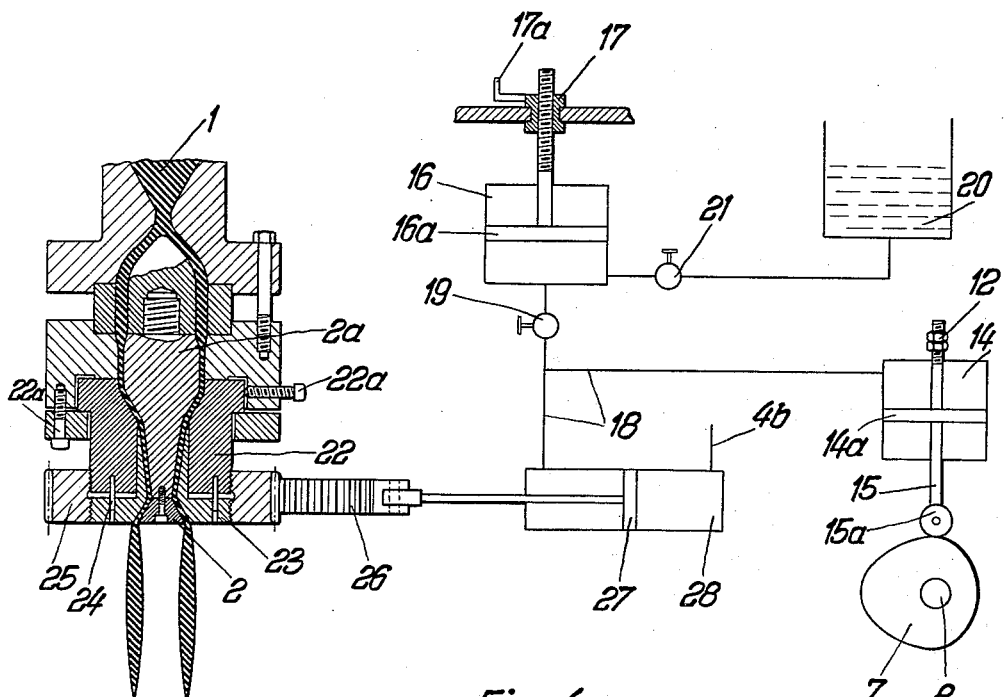
FIGURE 4 shows a similar embodiment for an injection head, in which the nozzle core is stationary and the nozzle sleeve is axially displaceable.

The example of embodiment in FIGURE 4 corresponds essentially to that in FIGURE 3, but here the nozzle core 2, 2a is stationary. The adjustment of the nozzle orifice is effected by moving the nozzle sleeve which consists of the two portions 22 and 23. The portion 22 is rigidly fixed, for example by means of screws 22a, to the extrusion head, while the portion 23 is guided in a bore in a portion 22 in the axial direction. In order to prevent mutual rotation of the two portions during this displacement, they are connected together by a pin 24, which is fixed in one of the portions and slides in a bore of the other portion. On the outside the two portions 22 and 23 have right and left hand threads respectively, and a nut 25 with right and left hand thread is applied on them, by whose rotation the two parts are removed from one another or brought together, in order to control the nozzle orifice. The rotation of the annular nut 25, which is provided externally with teeth, can be effected via a toothed rod 26 and a hydraulic piston 27. The cylinder 28 in which the piston 27 moves, is connected with the pipe 18 leading to the cylinder 14, which pipe as in the form of embodiment in FIGURE 3 is connected via a valve 19 to a pipe leading to the cylinder 16. The mode of operation is otherwise the same as in the embodiment in FIGURE 3. Here again the adjustment of the nozzle orifice is effected by the cam 7, whose shaft 8 is synchronously connected with the cams controlling the machine.

As can be seen from the above remarks, with all the forms of embodiment shown the control of the nozzle groove can be effected by the cam not only rectilinearly, but also in accordance with any desired cam shape, so that not only the form of the hollow bodies to be produced but also their wall thickness can be chosen along their length to correspond to the extant requirements.

I claim:
1. Apparatus for making bodies from thermoplastic synthetic material comprising a tubular extrusion nozzle having a throat jacket and a nozzle core adjustable with respect to the throat jacket and which is partially conical in shape as a cone and forms a correspondingly shaped surface as to the throat jacket, means to provide an adjustable outlet gap for the purpose of obtaining different wall thicknesses by adjusting the nozzle core and the throat jacket relative to each other during the extrusion of the tube, the surfaces of the throat jacket and of the nozzle core starting from the point of the outlet being conical forming an inwardly expanding gap, and control mechanism for adjustment of the outlet gap comprising a shaft with a cam thereon, a first hydraulic cylinder having a piston rod maintained in contact with said cam by pressure in said first hydraulic cylinder, a second hydraulic cylinder having a piston rod means to adjust said outlet gap, and fluid conduit means connecting said cylinders whereby fluid impulses produced by movement of said cam on said first cylinder piston rod produce movement of said second cylinder piston rod to thereby adjust said outlet gap.

2. Apparatus according to claim 1, in which a third cylinder with a manually adjustable piston is connected to the fluid conduit means to adjust the quantity of hydraulic fluid in the control mechanism.

3. Apparatus according to claim 1, in which the second hydraulic cylinder as to its piston rod is connected to actuate the nozzle core.

4. Apparatus according to claim 1, in which the second hydraulic cylinder as to its piston rod is connected to actuate the throat jacket.

References Cited by the Examiner

UNITED STATES PATENTS

| | | | |
|---|---|---|---|
| 2,379,956 | 7/1945 | Ersepke | 18—14 X |
| 2,632,202 | 3/1953 | Haines | 18—5 |
| 2,750,625 | 6/1956 | Colombo | 18—5 |
| 2,780,835 | 2/1957 | Sherman | 18—14 |
| 2,800,590 | 7/1957 | Gilman | 18—21 X |
| 3,002,615 | 10/1961 | Lemelson | 18—21 X |
| 3,019,481 | 2/1962 | Negoro | 18—5 |
| 3,032,810 | 5/1962 | Soubier | 18—5 X |
| 3,079,661 | 3/1963 | Lamb | 18—21 X |

FOREIGN PATENTS

| | | |
|---|---|---|
| 1,025,834 | 1/1953 | France. |
| 1,227,495 | 3/1960 | France. |

J. SPENCER OVERHOLSER, *Primary Examiner.*

MICHAEL V. BRINDISI, WILLIAM J. STEPHENSON,
*Examiners.*